INVENTORS
ROGER L. MERRILL
WILLIAM HECOX
BY
Corbett, Mahoney + Miller
ATTORNEYS

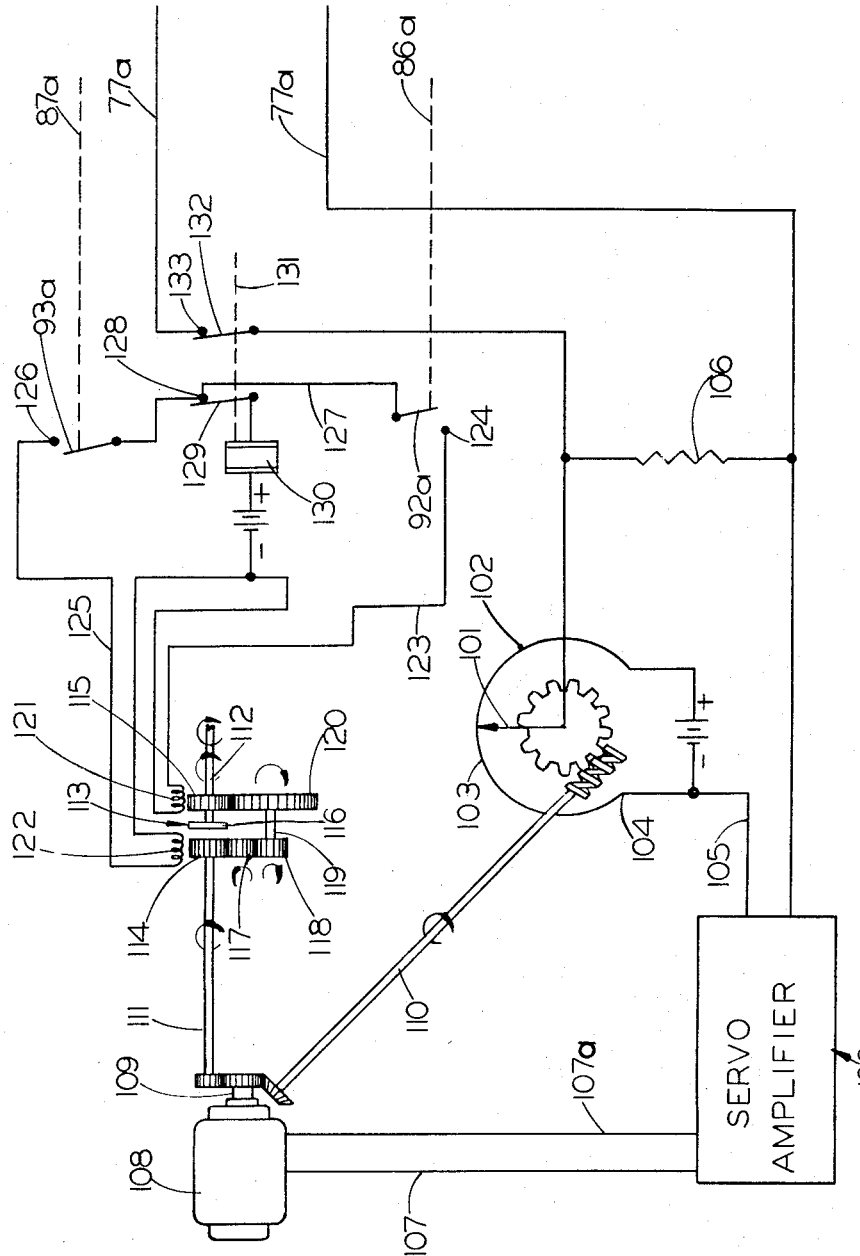

United States Patent Office 2,722,640
Patented Nov. 1, 1955

2,722,640

ELECTRONIC CONTROL DEVICE FOR COMPARING ONE VALUE WITH A NORMAL VALUE OR RANGE OF VALUES

Roger L. Merrill and William Hecox, Columbus, Ohio, assignors, by mesne assignments, to The Exact Weight Scale Company, Columbus, Ohio, a corporation of Ohio Application March 29, 1951, Serial No. 218,122

8 Claims. (Cl. 318—29)

Our invention relates to an electronic control device for comparing one value with a normal value or range of values. More specifically, it deals with an electronic control device which receives an input voltage and compares it with certain arbitrary voltage limits which have been previously set up in the device and if the input voltage is outside such limits, the device determines the amount of variation from such limits and either indicates such variations or controls a selected unit or units in accordance with such variation.

The control device of our invention has many applications. It is particularly suitable for use with the averaging device disclosed in our copending application Serial No. 218,123, filed March 29, 1951, now Patent No. 2,688,459, Sept. 7, 1954. However, it is capable of other uses, for example, in fire control applications, where it is desired to compare one value with a normal value or range of values.

In the following description, for illustrative purposes, we shall indicate that our device is used in connection with an averaging device of the type disclosed in our copending application mentioned above.

From any one of the averaging devices disclosed in our copending application, there is available an output which is a value of voltage, either positive or negative. This voltage will correspond to the average value of a particular variable characteristic in a group or series of objects being checked in regard to such characteristic. In the following description, we indicate, merely for example, that the variable is weight and that the voltage value introduced into our device corresponds to the average value of variation in weight, from a particular normal or desired weight, of the articles of a group or series being check-weighed.

The control device hereinafter described may be used, for example, for controlling the filling machine which fills packages before they are check-weighed. It utilizes such voltage value from the averager by comparing it with certain arbitrary limits which have been selected previously by proper adjustments in the device, these limits being based on normal permissible minor departures or tolerances from the exact weight desired. If the average value is outside those limits, either in a positive or negative direction, this control device determines the amount that the average value is beyond the particular limit. The device either indicates the correction that should be made to the filling machine or actually makes the correction by controlling a servo mechanism or other mechanism associated with the filling machine. The correction preferably includes a constant value in addition to the amount that the average value extends beyond one of said limits. This constant value is predetermined by observation and experimentation and depends somewhat on the type of product, the filling equipment and other factors. The correction could as well be a constant value plus a proportion of the quantity that the average value is beyond one of the limits. The optimum type of correction, however, is a constant value plus the value that the average extends beyond one of the limits.

In general, our control device utilizes voltage dividers which are varied in their resistance values by variations in the input voltage which is either positive or negative. The voltage dividers of the circuit preferably include adjustable resistances whereby certain arbitrary positive and negative voltage limits can be set up in the circuit. The input voltage causes variations of resistance values and, therefore, causes variations in the voltage dividers, depending upon the nature and strength of the input voltage, each of these voltage variations being balanced in the circuit against the arbitrary voltage limits. Associated in the circuit with these voltage dividers are vacuum tubes used as check valves and which do not permit the input voltage to be used further in the control device, unless said voltage is of such a nature and of such strength that it goes beyond either one of the preselected positive or negative voltage limits. If the input voltage does extend beyond either of such limits, a difference in potential is created which can be amplifier by a suitable amplifier connected in the circuit to produce an output voltage. The amplified current or output voltage is preferably used to control a pair of relay circuits, the circuit controlled depending upon whether the amplified potential or output voltage is positive or negative. The relays may be used for performing various selected control functions. For example, each relay may control a signal light circuit to indicate whether the output voltage is positive or negative. Each relay may also control a voltmeter circuit which is connected to the voltage dividers, the voltmeter being calibrated to indicate the amount that the input voltage exceeds either the positive or negative voltage limits, set up in the device, plus the selected constant. Furthermore, the relays may control a circuit, from the voltage dividers to a servo mechanism, which will control the setting up of the spout of the filler machine to either increase or decrease the feed, depending upon whether the input voltage is negative or positive, indicating that the packages are underweight or overweight.

The accompanying drawings illustrate diagrammatically two forms of our control device but it is to be understood that it can take other forms. In these drawings:

Figure 2 is another diagram illustrating the addition of a servo mechanism to the device of Figure 1.

Figure 1:
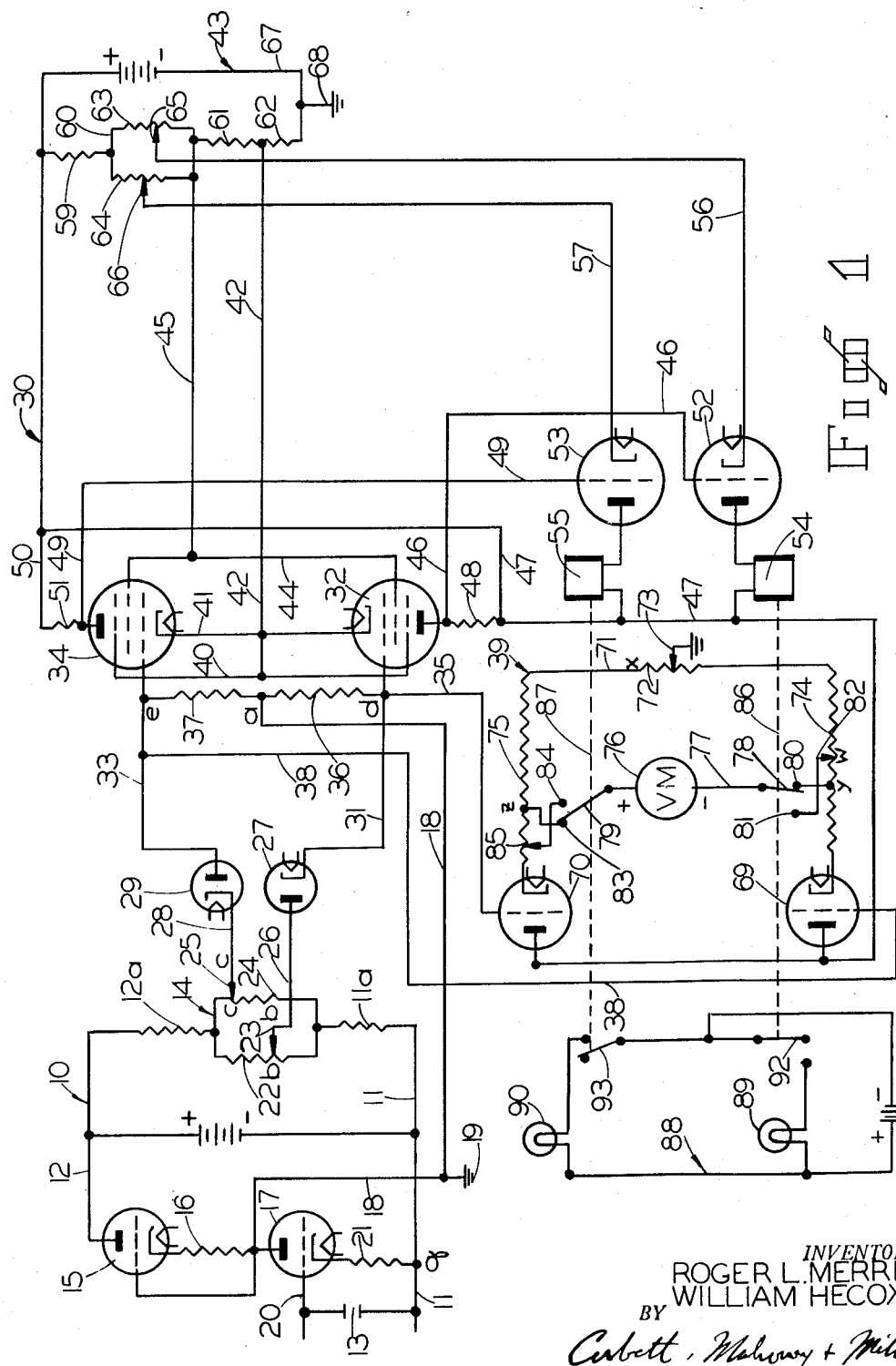
Figure 1 is a mechanical and electrical diagram of the control device.

The circuit of Figure 1 includes a voltage dividing section 10 which has a fixed power supply which, for illustration only, is shown in the form of a battery. The negative side of the battery is connected to a line 11 and the positive side to a line 12. This line 11 has one end connected to one side of a fixed condenser 13 and has a resistance 11a at its other end which is connected to an adjustable voltage divider 14. The line 12 has a resistance 12a at one end which is connected to the opposite side of the voltage divider 14 and its other end connected to the plate of a triode 15. The cathode of this triode 15 is connected by a line, including resistance 16, to the plate of a second triode 17, such line also being connected to a line 18. The line 18 is grounded at 19 and continues on to an amplifying circuit, which will be described later, the other end of line 18 being connected to the grid of the triode 15. A line 20 is connected to the other side of the condenser 13 and to the grid of the triode 17. The cathode of this triode is connected by a line, including resistance 21, to the line 11. By means of lines 11 and 20, the output voltage from the averager, either negative or positive, is introduced into our control device.

The voltage divider 14 includes a resistance 22 having an adjustable contact 23 associated therewith and a resistance 24 having an adjustable contact 25 associated therewith. The contact 23 is connected by line 26 to the plate of a diode 27 while the contact 25 is connected by line 28 to the cathode of the diode 29. The movable contacts 23 and 25 can be adjusted to set up the desired resistance in each side of the voltage dividing circuit section 10 so as to set up the desired voltage limits. The diodes 27 and 29 serve as check valves to prevent the passage of current to the amplifying section of the circuit unless the input voltage, either negative or positive, is greater than the voltage limits set up by adjustment of contacts 23 and 25.

The diodes 27 and 29 are connected to a D. C. high-gain amplifying circuit 30 which is shown as being of the two-stage type but may have additional stages as desired. The cathode of diode 27 is connected by line 31 to one of the grids of a pentode 32 of the amplifying circuit 30 while the plate of diode 29 is connected by line 33 to the corresponding grid of the pentode 34 of such circuit. The line 18 is connected to a line 35 which is connected across the lines 31 and 33 and interposed in this line are the two resistances 36 and 37, the connection of line 18 to line 35 being made between the resistances. The line 35 is continued on to a voltmeter circuit 39 which will be described later. A line 38 is connected to line 33 and it also leads to the voltmeter circuit 39. A line 40 connects another grid of tube 32 to the corresponding grid of tube 34 while a line 41 connects the cathodes of these tubes together. The lines 40 and 41 are both connected to a line 42 which is connected to the power supplying section 43 of the amplifying circuit. Another line 44 connects together the remaining grids of the tubes 32 and 34, this line also connecting with the power supplying section 43 by means of line 45. The plate of the tube 32 is connected to two lines 46 and 47, a resistance 48 being provided between the two lines. Similarly, the plate of the tube 34 is connected to the two lines 49 and 50 and a resistance 51 is provided between the two lines. The line 46 continues to the triode 52 of the amplifying circuit where it is connected to the grid thereof and similarly line 49 connects to the grid of the triode 53 of such circuit. The line 47 connects with line 50 which leads on to the power section 43 of the amplifying circuit. Two relays 54 and 55 are connected to line 47, the relay 54 being also connected to the plate of tube 52 and the relay 55 being connected to the plate of tube 53. The cathode of tube 52 is connected by line 56 to the power section 43 of the amplifying circuit and the cathode of tube 53 is connected to such section by a line 57.

The power supply section 43 of the amplifying circuit 30 includes a source of D. C. current, a battery being shown. The line 50 is connected to the positive side of this source and by a resistance 59 to one side of a voltage divider 60. The opposite side of the voltage divider is connected to line 45 and to a pair of resistances 61 and 62. The voltage divider includes the resistances 63 and 64 having the adjustable contacts 65 and 66, respectively, associated therewith. The contact 65 is connected to line 56 and the contact 66 is connected to line 57. The line 42 is connected between resistances 61 and 62. The resistance 62 is connected by line 67 to the negative side of the power source, this line being grounded at 68. By adjusting resistances 65 and 66, the voltage supplied directly to triodes 52 and 53 can be varied.

The voltmeter circuit 39 is provided with the two triodes 69 and 70. The line 38 connects to the grid of tube 69 and the line 35 connects to the grid of tube 70. The line 47 connects to the plates of both tubes 69 and 70. The cathodes of the two tubes are connected together by a line 71. This line 71 is provided with a resistance 72 having an adjustable grounded contact 73 associated therewith. Additional resistances 74 and 75 are interposed in line 71 adjacent the cathodes of the tubes 69 and 70. A voltmeter 76 is connected across the opposite sides of line 71 by a line 77. The line 77 is provided with a switch 78 at one end and with a switch 79 at its other end. The switch 78 includes a movable contact which moves between contact point 80, that is connected directly to resistance 74, and contact point 81, which is connected to a movable contact 82 associated with resistance 74. Similarly, the movable contact of switch 79 moves between contact point 83, connected directly to resistance 75, and contact point 84, which is connected to movable contact 85 associated with resistance 75. It will be noted that movable contacts 82 and 85 are on opposite sides of the connections of line 77 to the respective resistances 74 and 75. The movable arms of switches 78 and 79 are moved by means of mechanical connections to the respective relays 54 and 55 which are indicated by the dotted lines 86 and 87. The movable arms of switches 78 and 79 are normally in contact with their corresponding respective contact points 80 and 83, as shown. As previously indicated, the voltmeter will preferably be calibrated to indicate the amount of the output voltage plus a selected constant.

Associated with the voltmeter circuit 39 is a signal light circuit 88 for indicating whether the output voltage is negative or positive and, therefore, whether the packages are under weight or over weight. This circuit may include a light bulb 89 for indicating that the input voltage is in excess of the negative limit set up in our control device and a light bulb 90 for indicating that the input voltage is in excess of the positive limit, the light bulbs being connected in parallel. A source of power, a battery being shown, is connected in the circuit. A switch 92 controls light bulb 89 and is actuated by the mechanical connection 86 to relay 54. A switch 93 controls light bulb 90 and is actuated by mechanical connection 87 to relay 55. Both switches 92 and 93 are normally open as shown.

The operation of this control device will be apparent from the following which illustrates how it functions under various conditions created by various input voltages.

Let us consider first the situation when there is zero signal from the averager and no voltage is introduced into our control device through lines 11 and 20, that is, when the average value of the packages being checkweighed is exactly equal to the normal or desired weight. Using point $q$ as a reference point, it should be apparent that the voltage $qa$ will be a value exactly between the voltage $qb$ and the voltage $qc$. This would be the situation if the limits as set by the movable contacts 23 and 25, at $b$ and $c$ are equally disposed from the zero positions of the voltage divider 14. However, it is to be understood that the contacts 23 and 25, which determine the voltage limits, do not have to be equally disposed from the zero positions.

When voltage $qa$ is equal to or between voltages $qb$ and $qc$, voltages $ad$ and $ae$ will equal zero. In other words, as long as the average value is between the selected limits, the voltage across points $a$ and $d$ and the voltage across points $a$ and $e$ will be zero. The reason for this is as follows. When voltage $qa$ is equal to, or greater than voltage $qb$, point $a$ is more positive than point $b$, or conversely point $b$ is negative with respect to point $a$. The circuit from $b$ to $a$, passes through diode 27 and the plate of diode 27 will be more negative than the cathode of diode 27. The result is not to permit any current to flow through diode 27. Likewise, when voltage $qa$ is less than or equal to voltage $qc$, point $a$ is negative with respect to point $c$ and, consequently, the plate of diode 29 is negative with respect to the cathode thereof, thereby preventing any flow of current through diode 29.

Now let us assume that the signal or voltage introduced from the averager through lines 11 and 20 is of such a nature that it alters the resistance of triode 17 sufficiently to make voltage $qa$ less than voltage $qb$. When that situation arises, point $a$ is negative with respect to point $b$ and, consequently, the plate in diode 27 is positive with respect to the cathode. Consequently, there will be a voltage drop across point $a$ and $d$. For all practical purposes this voltage drop will be equal to the voltage across $a$ and $b$. The reason for this is that the resistance of the diode 27 is practically nil as compared to the resistance 36, since the plate is positive with respect to the cathode. Therefore, we are safe in assuming that voltage $ab$ equals voltage $ad$ when voltage $qa$ is less than voltage $qb$. It will be apparent that voltage $ae$ will still be zero because voltage $qa$ is, of course, less than voltage $qc$. Voltage $qa$ has to be less than voltage $qc$ since point $b$ is more negative than point $c$ and voltage $qa$ is less than voltage $qb$. Here again there will be no flow of current through the diode 29.

In this instance, let us assume that instead of an input voltage creating a change in resistance in diode 17 such that voltage $qa$ is less than voltage $qb$, the input voltage from the averager creates a change in resistance in diode 17 such that voltage $qa$ is greater than voltage $qc$. If such is the case, point $c$ will be negative with respect to point $a$, or conversely, point $a$ will be positive with respect to point $c$. The plate of diode 29 will be more positive than the cathode thereof and current will flow through such diode. Here again we may assume for our purposes that the voltage across points $a$ and $e$ is equal to the voltage across points $a$ and $c$. If an input voltage is introduced into the control device such as to provide a potential at $a$ which is beyond lower negative limit $b$, a voltage exists between points $a$ and $d$. This voltage is amplified in the two-stage amplifier 30 and is utilized in pentode 32 and triode 52 to affect relay 54. Relay 54 is normally energized and the result is that it now becomes deenergized. This causes bulb 89 to light, showing that a correction should be made in a positive direction to increase the quantity of material being dispensed from the filler. This also moves the contact of switch 78 against point 81, thereby connecting the voltmeter 76 to point $w$, the voltmeter having previously been connected to point $y$. The other end of the voltmeter remains connected to point $z$. All of these points exist on the respective legs of the voltmeter circuit, which as shown consists of the voltage dividers.

Utilizing point $x$ as a reference point with no signal in the circuit, the voltage $xy$ is equal to the voltage $xz$ since the resistance values between those respective points are equal. The distance on resistance 74 between points $y$ and $w$ represents the constant value which is to be added to the quantity that the average value is beyond a particular limit. This can be varied by adjustment of movable contact 82. Consequently, actuation of switch 78 results in voltage $xw$ being less than voltage $xz$ by such constant value. The voltmeter 76 will record this difference in value. At the same time that relay 54 is being acted upon by the amplified voltage between points $a$ and $d$, triode 70 is also affected. The grid of this triode has a positive voltage thereon which decreases the resistance of the triode and, consequently, makes the voltage between points $x$ and $z$ greater, since the resistance between points $x$ and $z$, which is unchanged, becomes a greater proportion of the total resistance between the point $x$ and the plate of the triode 70. The voltmeter 76 thus reads the sum of the constant value between $w$ and $y$ and the increase in voltage $xz$. This latter value is proportional to the quantity that the input voltage from the averager extends beyond the negative limit set up in the control device. This will indicate the amount of correction which should be made on the filler to cause it to feed more material.

If the input voltage from the averager is such that it provides a potential at $a$ that is above the positive limit $c$, a voltage exists between points $a$ and $e$, and the device will function in a similar manner to actuate switch 93 and cause lighting of bulb 90 to indicate that an adjustment should be made to cause the filler to feed less material. The voltmeter 76 will again indicate the amount of the necessary adjustment.

In Figure 2, we have illustrated a mechanical and electrical arrangement by which the amplified voltage from our device may be used for actually controlling the filler. This circuit includes a servo mechanism which actuates the filler. However, it is to be understood that other servo units or actuating units may be provided.

In the example of an actuating mechanism shown in Figure 2, the lines 77a are from the two sides of the voltmeter circuit 39 of Figure 1, which voltmeter may be removed if desired. One of the lines 77a leads to a servo amplifier 100 which may be of any suitable type and is, therefore, not illustrated in detail. The other line 77a is connected to the movable contact 101 of a potentiometer 102. The potentiometer includes the slide wire 103 which is connected to a source of current shown as a battery, the zero position on the wire being indicated at 104. A line 105 leads from the potentiometer to the amplifier 100. Across the lines 77a, ahead of their connection to amplifier 100, is connected a resistance 106. The amplifier 100 is connected by lines 107 and 107a to an electric motor 108 of the reversible type. The drive shaft 109 of the motor is connected by a driving connection, indicated generally by numeral 110, to the contact arm 101 of the potentiometer 102 so that each time the drive shaft rotates in either direction, the arm 101 swings in a corresponding direction away from or back to zero position 104. The drive shaft 109 of the motor also is geared to a shaft 111 that is adapted to drive an output shaft 112 through the medium of a magnetic clutch indicated generally by numeral 113. The output shaft 112 will be connected to the filler adjusting unit or other unit to be controlled.

The clutch 113 includes the gear 114 which is keyed on shaft 111 and the gear 115 which is freely rotatable on shaft 112, the shaft also being movable axially therethrough. Between the gears 114 and 115 is a magnetic clutch disk 116 which is keyed on shaft 112 and which is adapted to move into engagement with the adjacent clutch faces of either of the gears 114 and 115 but which is normally kept in neutral position by a suitable spring arrangement (not shown). The gear 114 drives an idler pinion 117 which drives the gear 118 of a double gear unit 119, the other gear 120 of this unit meshing with gear 115. This gear 114 will be driven in one direction by shaft 111 and gear 115 will be driven in an opposite direction. However, with disk 116 in neutral position, neither gear 114 nor gear 115 is connected to the shaft 112. If clutch disk 116 is moved against gear 114, the shaft 112 will be driven in one direction and, on the other hand, if disk 116 is moved to engage gear 115, the shaft 112 will be driven in an opposite direction. The means for controlling movement of the magnetic disk 116 comprises the coils 121 and 122 associated therewith so that each coil when energized will pull the disk in one direction.

The coil 121 is interposed in a line 123, one end of which is connected to the contact point 124 which is associated with a movable contact arm 92a. The other end of line 123 is connected to a source of current indicated as a battery. Similarly, the coil 122 is interposed in a line 125 which has one end connected to the current source and its other end connected to a contact point 126 which is associated with a movable contact arm 93a. The arms 92a and 93a, like the arms 92 and 93, of Figure 1 are actuated by the relays 54 and 55 of Figure 1, being connected thereto by mechanical connections 86a and 87a. The lights 89 and 90 of Figure 1 may or may not be used as desired. The arms 92a and 93a are connected together by a line 127 which has a contact 128 connected therein. A movable contact arm 129 is associated with contact point 128 and is actuated by a time delay relay 130 which is connected to the same source of current that is connected to coils 121 and 122. The arm 129 is connected by a mechanical connection 131 to a movable contact arm 132 that is associated with a contact point 133, both contacts being in the adjacent line 77a.

The operation of this device is as follows:

Normally the contact arms 129 and 132 engage their respective contact points 128 and 133 and the potentiometer contact arm 101 is at zero position 104. If there is a correction indicated by our control device of Figure 1 and, therefore, a voltage output across the lines 77a, this voltage will be put into the servo amplifier 100 and thereby result in rotation of motor drive shaft 109. The rotation of shaft 109, through drive connection 110, causes potentiometer arm 101 to move along the slide wire 103, which in effect is a voltage divider, until a bucking voltage has been produced which will balance the connection voltage, thereby stopping the movement of motor shaft 109. Rotation of shaft 109 causes rotation of shaft 111 but will not rotate shaft 112 until the clutch 113 is engaged. When a correction output voltage is obtained from the control device of Figure 1, either contact arm 92a or contact arm 93a is engaged with the respective contact points 124 and 126, due to energization of relay 55 or the deenergization of relay 54. This will cause energization of the corresponding coil 121 or 122, thereby moving clutch disk 116 into contact with gear 115 or 114. Therefore, the direction of rotation of shaft 112 and the direction of correction of the filler adjustment will depend upon which movable contact arm, either 92a or 93a, is closed. The amount of filler correction is dependent upon the number of rotations of motor 123, which, in turn, is dependent upon the value of the voltage across lines 77a.

Closure of movable contact arms 92a or 93a results in an additional circuit being closed. This circuit actuates the relay 130 but since this relay is a time delay relay, it does not function to swing contact arms 129 and 132 to open position for a fixed length of time which is sufficient to enable the correction to be made to the filler. Such actuation of the relay, when it does occur, reduces the correction voltage to zero and, consequently, unbalances potentiometer 102 which actuates the servo amplifier 100. This causes the motor drive shaft 109 to rotate in the opposite direction, until movable contact arm 101 is returned to zero point 104. Such rotation of shaft 109 will produce reverse rotation of shaft 111 but this will not affect the filler because since contact arm 129 is at this time in open position, even though either contact arm 92a or 93a is in closed position, the circuit for magnetic clutch 113 will be interrupted and neither coil 121 nor coil 122 will be energized and, consequently, disk 116 will be in neutral position. Movement of contact arms 129 and 132 also functions to deenergize relay 130 but in this function there is also a time delay because of the nature of such relay. Consequently, relay 130 holds contact arms 129 and 132 in open position until sufficient time has elapsed that another signal can be put into our control device of Figure 1 and will result in an output voltage therefrom if a correction is to be made so that either contact 92a or 93a will be moved into closed position and result in making the correction in the proper direction.

It will be apparent from the above that we have provided an electronic control device which receives an input voltage from some source and compares it with certain arbitrary voltage limits set up in the device. If the input voltage is outside such limits, the device determines the amount of variation from such limits, indicates such variation and may even control a selected unit in accordance with such variation.

Having thus described our invention, what we claim is:

1. A control device comprising an electronic circuit including a voltage dividing section, means for supplying an input voltage, either negative or positive, to said section, adjustable means in said section to set up selected negative and positive voltage limits, a vacuum tube amplifier in said circuit, vacuum tube check-valves connected in said circuit between said voltage dividing section and said amplifier to prevent the input voltage from reaching the amplifier unless it extends beyond one of the voltage limits, an actuating section of the circuit connected to the amplifier for utilizing any output voltage therefrom, servo-mechanism for actuating the unit to be controlled, and a circuit connected to servo mechanism and to said actuating section of the circuit for controlling said servo-mechanism by the input voltage supplied by said amplifier.

2. A control device comprising an electronic circuit including a voltage dividing section, means for supplying an input voltage, either negative or positive, to said section, adjustable means in said section to set up selected negative and positive voltage limits, a vacuum tube amplifier in said circuit, vacuum tube check-valves connected in said circuit between said voltage dividing section and said amplifier to prevent the input voltage from reaching the amplifier unless it extends beyond one of the voltage limits, and an actuating section of the circuit connected to the amplifier for utilizing any output voltage therefrom, servo-mechanism for actuating the unit to be controlled, a circuit connected to said servo mechanism and to said amplifier circuit for controlling said servo-mechanism, said servo-mechanism including an output member adapted to be connected to the unit to be controlled and movable in opposite directions, and means connected in said servo circuit to selectively move said output member in either direction depending upon whether said output voltage is negative or positive.

3. A control device according to claim 2 wherein said last-named means moves said output member to various degrees dependent upon the strength of said output voltage supplied to the servo circuit.

4. A control device according to claim 3 including time delay means for opening and closing said servo circuit each time an output voltage charge from said amplifier circuit is supplied thereto.

5. A control device comprising an electronic circuit with a voltage dividing section including a direct voltage source and an element having a resistance that is variable in response to any input voltage, either negative or positive, applied thereto, means for supplying an input voltage, either negative or positive, to said variable-resistance element of said voltage dividing section, adjustable means in said section to set up selected negative and positive voltage limits, a vacuum tube amplifier in said circuit, vacuum tube check-valves connected in said circuit between said voltage dividing section and said amplifier to prevent the voltage across said variable resistance element, as determined by the input voltage, from reaching the amplifier unless it extends beyond one of the voltage limits, and an actuating section of the circuit connected to the amplifier for utilizing any output voltage therefrom.

6. A control device comprising an electronic circuit including a voltage dividing section, means for supplying an input voltage, either negative or positive, to said section, adjustable means in said section to set up selected negative and positive voltage limits, a vacuum tube amplifier in said circuit, vacuum tube check-valves connected in said circuit between said voltage dividing section and said amplifier to prevent the input voltage from reaching the amplifier unless it extends beyond one of the voltage limits, and an actuating section of the circuit connected to the amplifier for utilizing any output voltage therefrom, said actuating section of the circuit including a voltmeter, resistance means having a pair of fixed contacts and a pair of movable contacts thereon, so connected as to provide between said fixed contacts a voltage proportionate to any output voltage from said amplifier, a pair of relays so connected to said amplifier that one is actuated by positive output voltage and the other by negative output voltage from said amplifier, a first switch actuatable by one said relay for switching one terminal of said voltmeter from one said fixed contact on said resistance means to one said movable contact thereon, and a second switch actuatable by the other said relay for switching the other terminal of said voltmeter from the other said fixed contact on said resistance means to the other said movable contact thereon, in such manner as to connect across said voltmeter when the output voltage of said amplifier is positive a first predetermined voltage in series with said voltage proportionate to said output voltage, and to connect across said voltmeter when the output voltage of said amplifier is negative a second predetermined voltage in series with said voltage proportionate to said output voltage.

7. A control device according to claim 6 including a signal light circuit having a pair of lights connected in parallel, a pair of switches for controlling said lights and each switch being connected in series in said light circuit with the respective light which it controls, and an actuating connection between each of said switches and one of said relays.

8. A control device comprising an electronic circuit including a voltage dividing section, means for supplying an input voltage, either negative or positive, to said section, adjustable means in said section to set up selected negative and positive voltage limits, and an actuating section of the circuit connected to said voltage dividing section of the circuit for utilizing any output voltage therefrom, said actuating section of the circuit including a voltmeter, resistance means having a pair of fixed contacts and a pair of movable contacts thereon, so connected as to provide between said fixed contacts a voltage proportionate to any output voltage from said voltage dividing section, a pair of relays so connected to said voltage dividing section that one is actuated by positive output voltage and the other by negative output voltage from said voltage dividing section, a first switch actuatable by one said relay for switching one terminal of said voltmeter from one said fixed contact on said resistance means to one said movable contact thereon, and a second switch actuatable by the other said relay for switching the other terminal of said voltmeter from the other said fixed contact on said resistance means to the other said movable contact thereon, in such manner as to connect across said voltmeter when the output voltage of said voltage dividing section is positive a first predetermined voltage in series with said voltage proportionate to said output voltage, and to connect across said voltmeter when the output voltage of said voltage dividing section is negative a second predetermined voltage in series with said voltage proportionate to said output voltage, a signal light circuit having a pair of lights connected in parallel, a pair of switches for controlling said lights and each switch being connected in series in said light circuit with the respective light which it controls, and an actuating connection between each of said switches and one of said relays.

References Cited in the file of this patent

UNITED STATES PATENTS

| | | |
|---|---|---|
| 1,920,803 | Nagashev | Aug. 1, 1933 |
| 2,312,357 | Odquist et al. | Mar. 2, 1943 |
| 2,329,073 | Mitchell et al. | Sept. 7, 1943 |
| 2,440,002 | Bower | Apr. 20, 1948 |
| 2,475,692 | Rosoff | June 28, 1949 |
| 2,479,051 | Sunstein | Aug. 16, 1949 |
| 2,479,051 | Sunstein | Aug. 16, 1949 |
| 2,481,500 | Crowl | Sept. 13, 1949 |
| 2,490,026 | Buckbee | Dec. 6, 1949 |
| 2,497,693 | Shea | Feb. 14, 1950 |
| 2,505,072 | Sunstein | Apr. 25, 1950 |
| 2,525,466 | Wald | Oct. 10, 1950 |
| 2,533,769 | Couillard | Dec. 12, 1950 |
| 2,542,787 | Ziebolz | Feb. 20, 1951 |
| 2,546,371 | Peterson | Mar. 27, 1951 |